(12) United States Patent
Chien

(10) Patent No.: US 10,867,008 B2
(45) Date of Patent: Dec. 15, 2020

(54) HIERARCHICAL JACOBI METHODS AND SYSTEMS IMPLEMENTING A DENSE SYMMETRIC EIGENVALUE SOLVER

(71) Applicant: NVIDIA CORPORATION, Santa Clara, CA (US)

(72) Inventor: Lung-Sheng Chien, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 73 days.

(21) Appl. No.: 16/124,807

(22) Filed: Sep. 7, 2018

(65) Prior Publication Data

US 2019/0138568 A1     May 9, 2019

Related U.S. Application Data

(60) Provisional application No. 62/556,229, filed on Sep. 8, 2017.

(51) Int. Cl.
    *G06F 17/16*      (2006.01)

(52) U.S. Cl.
    CPC .................. *G06F 17/16* (2013.01)

(58) Field of Classification Search
    CPC ........................................... G06F 17/16
    USPC ........................................... 708/520
    See application file for complete search history.

(56) References Cited

U.S. PATENT DOCUMENTS

| | | | |
|---|---|---|---|
| 6,182,270 B1 * | 1/2001 | Feldmann | G06F 30/367 716/136 |
| 7,711,762 B2 | 5/2010 | Howard et al. | |
| 2003/0187898 A1 | 10/2003 | Nakanishi | |
| 2006/0106902 A1 * | 5/2006 | Howard | G06F 17/16 708/200 |

(Continued)

OTHER PUBLICATIONS

Wolfram Mathworld, https://mathworld.wolfram.com/JacobiMethod.html, accessed 2015 (Year: 2015).*

(Continued)

*Primary Examiner* — Andrew Caldwell
*Assistant Examiner* — Emily E Larocque
(74) *Attorney, Agent, or Firm* — Shook, Hardy & Bacon, LLP

(57) ABSTRACT

Embodiments of the present invention provide a hierarchical, multi-layer Jacobi method for implementing a dense symmetric eigenvalue solver using multiple processors. Each layer of the hierarchical method is configured to process problems of different sizes, and the division between the layers is defined according to the configuration of the underlying computer system, such as memory capacity and processing power, as well as the communication overhead between device and host. In general, the higher-level Jacobi kernel methods call the lower level Jacobi kernel methods, and the results are passed up the hierarchy. This process is iteratively performed until a convergence condition is reached. Embodiments of the hierarchical Jacobi method disclosed herein offers controllability of Schur decomposition, robust tolerance for passing data throughout the hierarchy, and significant cost reduction on row update compared to existing methods.

14 Claims, 10 Drawing Sheets

(56) References Cited

U.S. PATENT DOCUMENTS

| | | | |
|---|---|---|---|
| 2006/0287596 A1* | 12/2006 | Johnson | A61B 8/14 600/437 |
| 2007/0157135 A1* | 7/2007 | Yang | G06F 30/367 716/111 |
| 2010/0082142 A1* | 4/2010 | Usadi | G06N 20/00 700/104 |
| 2010/0185716 A1 | 7/2010 | Nakamura et al. | |

OTHER PUBLICATIONS

J. Hennessy et al., Computer architecture: a quantitative approach, Elsevier, p. 542-545, 2014 (Year: 2014).*

B. Ram, Computer fundamentals: Architecture & organization, New Age International ltd, p. 8.25-8.27, 2007 (Year: 2007).*

Patterson et al, Computer Organization and Design, the hardware/software interface, Elsevier, p. A-10-11, A-17-19, 2012 (Year: 2012).*

Sachdev, et al.; Takagi Factorization on GPU Using CUDA; School of Computing, University of Utah, UT, 84102; 2010.

Golub, G. H., & Van Loan, C. F. (2012). Matrix computations (vol. 3). JHU press. (9 pages).

Blackford, Susan. Symmetric Eigenproblems. (1999). LAPACK Users' Guide Third Edition. Retrieved on Mar. 6, 2020 from URL: http://www.netlib.org/lapack/lug/node48.html (3 pages).

Blackford, Susan. Symmetric Eigenproblems (SEP). (1999). LAPACK Users' Guide Third Edition. Retrieved on Mar. 6, 2020 from URL: http://www.netlib.org/lapack/lug/node30.html.

Nakatsukasa, Y., & Higham, N. J. (2013). Stable and efficient spectral divide and conquer algorithms for the symmetric eigenvalue decomposition and the SVD. SIAM Journal on Scientific Computing, 35(3), A1325-A1349. (25 pages).

* cited by examiner

Dimension *n* is not a multiple of block size *w*

HIERARCHICAL JACOBI METHODS AND SYSTEMS IMPLEMENTING A DENSE SYMMETRIC EIGENVALUE SOLVER

CROSS-REFERENCES TO RELATED APPLICATIONS

This Application claims the benefit of U.S. Provisional Patent Application No. 62/556,229, filed Sep. 8, 2017, which is incorporated by reference in its entirety.

FIELD

Embodiments of the present invention generally relate to the field of computer-implemented systems and methods involving computational solvers. More specifically, embodiments of the present invention relate to computer-implemented eigenvalue solvers that are useful for solving problems expressed as dense symmetric matrices.

BACKGROUND

Eigenvalues are a special set of scalars associated with a linear system of equations. The decomposition of a square matrix A into eigenvalues and eigenvectors may be referred to as an Eigen decomposition. Eigenvalue solvers implemented within computer systems for solving problems are well known in life sciences, with useful applications in mechanical structure design, machine learning, facial recognition, quantum chemistry, and electromagnetism, among other fields and pursuits. In many of these fields, Eigen decomposition is equivalent to matrix diagonalization—for example, when performing stability analysis, determining the physics of rotating bodies, and calculating small oscillations of vibrating systems. Within these useful applications, problems can be expressed as symmetric matrices and then a computer-implemented solver can be used to produce an eigenvalue result which may then be used to arrive at a useful solution to the real-world problem.

SUMMARY

The present disclosure describes a technique for computing linear transformations using functions configured to target different problem sizes, where one function calls another function to compute linear transformations on a subproblem depending on the problem size. In this way, a symmetric eigenvalue solver is provided to harness the parallelism of modern processors (e.g., graphics processing units) to compute large-scale linear transformations for dense symmetric matrices. For example, methods for performing multiple coordinated Jacobi methods to implement a symmetric eigenvalue solver are disclosed herein. Different Jacobi method variations are used for different problem sizes, the results are passed up the layers, and the methods may be iteratively performed until a convergence condition is reached.

There are three general approaches to diagonalize a symmetric matrix: symmetric QR algorithms, the spectrum method and the Jacobi method. The Jacobi method is more expensive in terms of complexity, but is superior to the other approaches at parallel computation in multi-core, multi-GPU (graphics processor unit) or cluster computing environments. Therefore, there is a great need for a computer-implemented symmetric eigenvalue solver that harnesses the parallelism of modern processors (e.g., graphics processing units) to solve large eigenvalue problems for dense symmetric matrices.

Accordingly, embodiments of the present invention are drawn to computer-implemented methods and systems used for accelerating a dense symmetric eigenvalue solver. According to some embodiments, a hierarchical, multi-layer Jacobi method for implementing a dense symmetric eigenvalue solver using multi-core processors is disclosed. Each layer of the hierarchical method is configured to process problems of different sizes, and the division between the layers is defined according to the configuration of the underlying computer system, such as memory capacity and processing power, etc., as well as the communication overhead between the computing device and the host. In general, within the hierarchical architecture of the solver, the higher-level Jacobi kernel methods call the lower level Jacobi kernel methods, and the results are passed up the hierarchy. This process is iteratively performed until a convergence condition is reached. Embodiments of the hierarchical Jacobi method disclosed herein offer several advantages, including: performing a Schur decomposition that can be adjusted to improve the speed or accuracy of the method; robust tolerance for passing data throughout the hierarchy; and significant cost reduction on row update functions compared to existing methods.

Moreover, embodiments of the present invention obtain robust scaling performance using multi-GPU Jacobi methods. The multi-GPU solutions can process large matrices that are accommodated in a single node, while other solutions are not able to achieve this advantage. Also, the performance of the Jacobi method is proportional to the performance of GEMM (General Matrix Multiplication) used for linear algebra computations (e.g., matrix operations); therefore, if the performance of the GEMM is doubled, then the performance of the Jacobi method is also doubled. This advantage creates an opportunity for using GPUs for solving large eigenvalue problems.

According to one embodiment of the present invention, a method for computing eigenvectors for a symmetric matrix is disclosed. The method includes: executing a first kernel method (e.g., syevj_multiGPU) to decompose the symmetric matrix into a plurality of subproblems; executing a second kernel method (e.g., syevj_large) on a first processor to perform a second Jacobi method variant on a first subproblem of the plurality of subproblems, where the second Jacobi method variant is called by the first kernel method, and passing the results of the second Jacobi method variant back to the first kernel method and performing a first Jacobi method variant on the symmetric matrix using the first kernel method and the results of the second Jacobi method variant, where the above steps are iteratively repeated until the symmetric matrix converges to form the resultant eigenvector. According to some embodiments, the method is performed by a system for calculating eigenvectors for a symmetric matrix. The system includes a memory configured to store the symmetric matrix and the eigenvectors, and a first processor coupled to the memory and configured to execute the kernel methods.

According to some embodiments, where second Jacobi method variant calls a third Jacobi method variant executed by a third kernel method (e.g., syevj_medium), and the method includes executing the third kernel method on the first processor to perform the third Jacobi method variant on a second subproblem, and passing the results of the third Jacobi method variant to the second kernel method, where the second subproblem is a subproblem of the first subproblem, executing a fourth kernel method (e.g., syevj_batch) on the first processor to perform the fourth Jacobi method variant on a third subproblem, and passing the results of the fourth Jacobi method variant to the third kernel method, wherein the third subproblem is a subproblem of the second subproblem.

According to another embodiment, a computer-implemented method for solving for eigenvectors associated with a symmetric matrix is disclosed. The method includes: a) decomposing the symmetric matrix into a plurality of sub-matrices, and for each sub-matrix, performing the following: determining a size of an input sub-matrix; generating an updated sub-matrix by performing a batched parallel order Jacobi method on the input sub-matrix provided a size of the input sub-matrix is less than or equal to a first threshold of rows; generating the updated sub-matrix by performing a parallel order block Jacobi method on the input sub-matrix when the size of the input sub-matrix is greater than said first threshold of rows and less than or equal to a second threshold of rows; generating the updated sub-matrix by performing a classical block Jacobi method on the input sub-matrix when the size of the input sub-matrix is greater than the second threshold of rows and less than or equal to a third threshold of rows; and generating the updated sub-matrix by performing a multi-GPU classical Jacobi method on the input sub-matrix when the size of the input sub-matrix is greater than the third threshold rows and less than or equal to a fourth threshold rows; and the method continues with b) updating the symmetric matrix using the updated sub-matrices. Within the method, steps a) and b) are iteratively performed until the symmetric matrix converges to a diagonal matrix.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
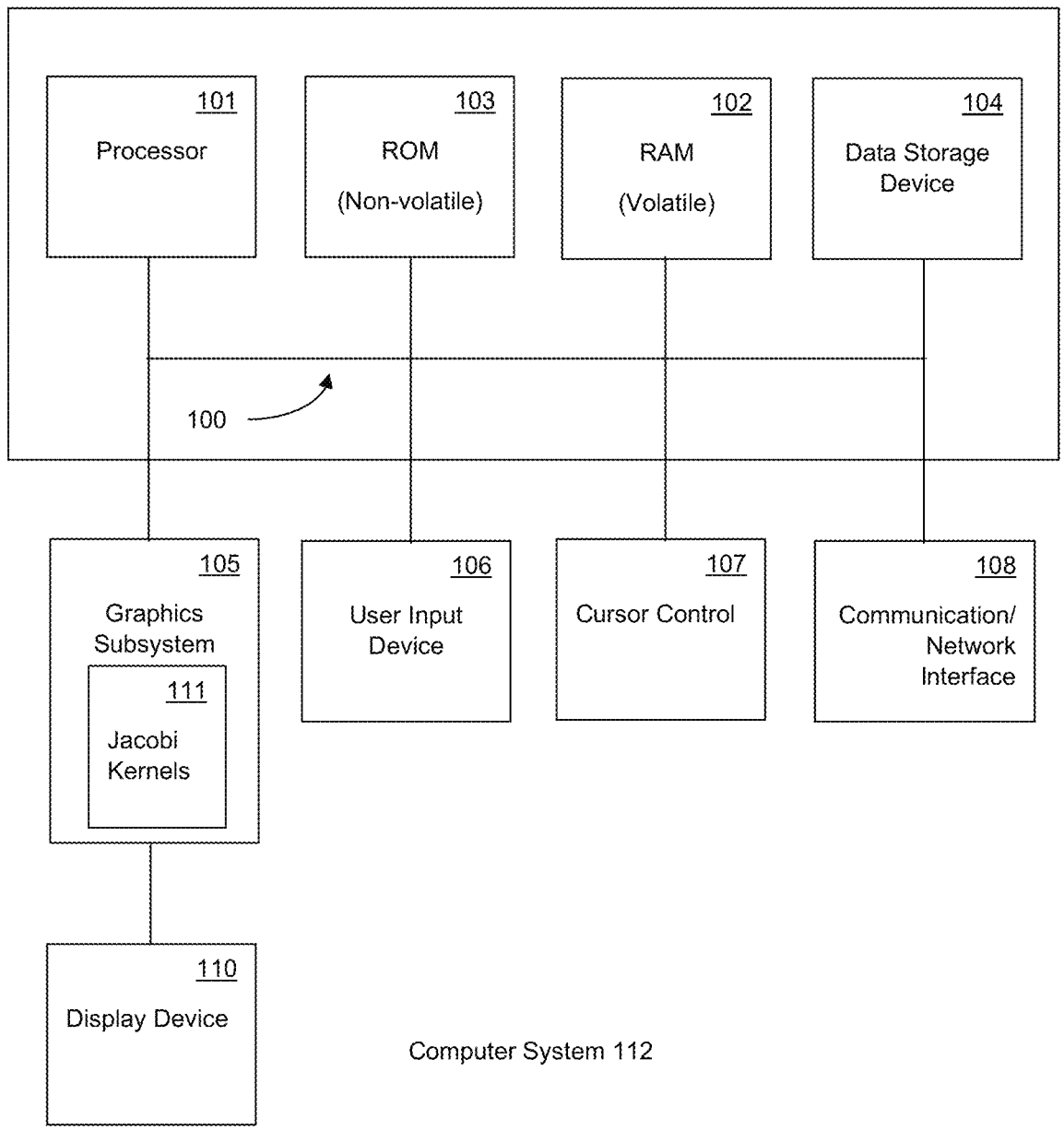
FIG. 1 is a block diagram of an exemplary computer system platform that can be used for executing a computer-implemented eigenvalue solver according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternatives, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIGS. 3-6) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying," "calculating," "solving," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Computer System Platform for Executing a Multi-Layer Jacobi Method for Implementing a Dense Symmetric Eigenvalue Solver Embodiments of the present invention are drawn to computer systems for performing Eigen decompositions, matrix diagonalization, or other matrix operations on dense symmetric matrices for calculating eigenvectors. The following discussion describes one such exemplary computer system platform.

In the example of FIG. 1, the exemplary computer system 112 includes a central processing unit (CPU) 101 for running software applications and optionally an operating system. Random access memory 102 and read-only memory 103 store applications and data for use by the CPU 101. Data storage device 104 provides non-volatile storage for applications and data and may include fixed disk drives, removable disk drives, flash memory devices, and CD-ROM, DVD-ROM or other optical storage devices. The optional user inputs 106 and 107 comprise devices that communicate inputs from one or more users to the computer system 112 (e.g., mice, joysticks, cameras, touch screens, and/or microphones).

A communication or network interface 108 allows the computer system 112 to communicate with other computer systems, networks, or devices via an electronic communications network, including wired and/or wireless communication and including an Intranet or the Internet. The display device 110 is optional and may be any device capable of displaying visual information in response to a signal from the computer system 112 and may include a flat panel touch sensitive display, for example. The components of the computer system 112, including the CPU 101, memory 102/103, data storage 104, user input devices 106, and graphics subsystem 105 may be coupled via one or more data buses 100.

In the embodiment of FIG. 1, a graphics sub-system 105 may be coupled with the data bus and the components of the computer system 112. The data bus may be used to communicate data (e.g., matrices) between the host computer system and a device, such as a graphics processing unit (GPU), for processing by the GPU. The graphics sub-system 105 may comprise a physical GPU and graphics/video memory. Graphics sub-system 105 can output display data to display device 110. The GPU may contain one or many individual cores, therefore, the GPU may be multi-core and there may be more than one physical GPU included in graphics sub-system 105.

A physical GPU of graphics sub-system 105 can be configured as multiple virtual GPUs that may be used in parallel (e.g., concurrently) by a number of applications or processes executing in parallel, or multiple physical GPUs may be used simultaneously. In accordance with embodiments of the present invention, the graphics sub-system 105 may include memory for storing a set of Jacobi kernel methods 111 for performing calculations of a hierarchical Jacobi method, such as Eigen decompositions and other dense symmetric matrix operations (e.g., multiplication or diagonalization), in parallel using a plurality of the above-described processing cores of the GPU. The graphics sub-system 105 may include multiple physical GPUs, and a multi-GPU kernel method (e.g., syevj_multiGPU) that distributes work among the multiple physical GPUs. For example, each physical GPU may be configured to compute a Schur decomposition (e.g., an Eigenvalue solver). The multiple physical GPUs may perform the work in parallel with one another and return the results of the work to the multi-GPU kernel method or the host memory 102.

In accordance with embodiments of the present invention, the Jacobi kernel methods 111 may include various kernel methods for executing calculations of a hierarchical Jacobi method (see FIG. 2B, for instance) in parallel, such as a syevj_large kernel method for processing large problems, a syevj_medium kernel method for processing medium problems, and a syevj_batch kernel method for processing small problems. Regarding the nomenclature, syevj indicates that the kernel method is a Jacobi-based symmetric eigenvalue solver, and the term following the underscore (e.g., large, medium, and batch) indicates the problem size that the kernel method is useful for. Each of these exemplary kernel methods is described in detail below.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Hierarchical Jacobi Method for Leveraging Memory Hierarchy and Parallelism

Figure 2A:
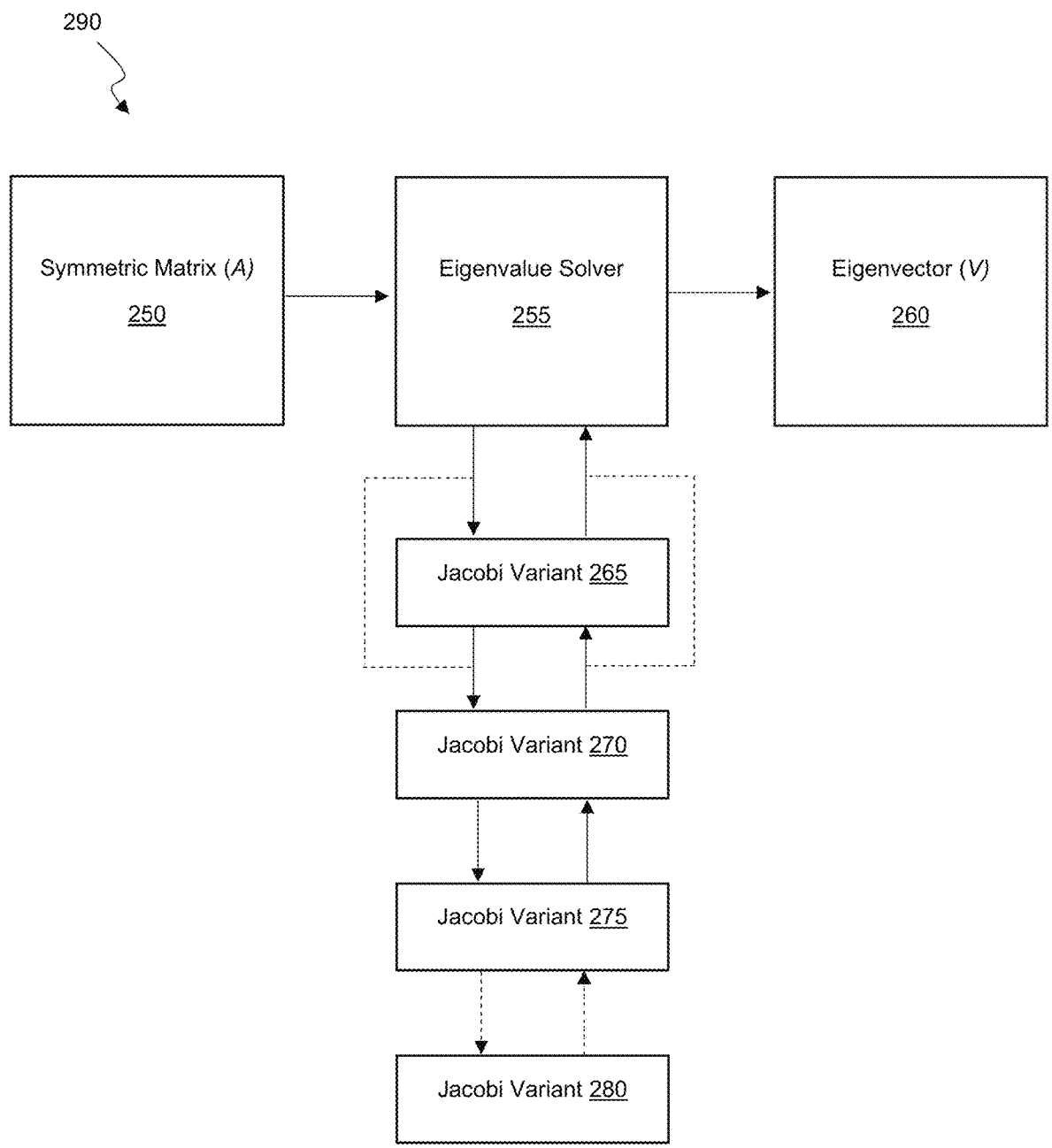
FIG. 2A depicts an exemplary sequence of computer-implemented steps and data flow diagram for computing eigenvectors of a symmetric matrix depicted according to embodiments of the present invention.

With regard to FIG. 2A, an exemplary data flow diagram for computing eigenvectors 260 including eigenvalues of a symmetric matrix 250 is depicted according to embodiments of the present invention. In accordance with the system 290, a problem can be expressed as a symmetrical matrix 250 of values stored in computer readable memory. The memory resident symmetric matrix 250 is provided as input to an eigenvalue solver 255 implemented in accordance with embodiments of the present invention, and the eigenvalue solver 255 performs a series of Jacobi method variants to produce or update the eigenvector 260 of the symmetric matrix 250. The eigenvector 260 includes eigenvalues and is also stored in memory. According to some embodiments, the symmetric matrix 250 and the eigenvector 260 are stored on a host processor (e.g., CPU), and the eigenvalue solver 255 performs a hierarchical Jacobi method using one or more GPUs. Data may be transferred between the host processor and the GPUs using a communication interface, e.g., a PCI-E interface. The eigenvalue solver 255 uses a first Jacobi method variant 265 to perform a series of transformations on the symmetric matrix 250.

According to some embodiments, a plurality of graphics processing units is available for performing the transformations. In this case, the first Jacobi method variant 265 performs a variant of Classical Block Jacobi to tile symmetric matrix 250 and eigenvector 260 into N-by-N blocks (e.g., 1024-by-1024 blocks), and is also configured to perform Schur decomposition and column and row updates of the symmetric matrix 250. The tiled blocks (e.g., submatrices or subproblems) are provide to a second Jacobi method variant 270 to perform transformations on the subproblems—for example, using a Parallel Order Block Jacobi method variant, or a Classical Block Jacobi method variant, depending on the size of the subproblem (see Table I below). According to some embodiments, if the second Jacobi method variant 270 is configured to perform a Classical Block Jacobi method variant, the second Jacobi method variant 270 calls the third Jacobi method variant 275 configured to perform the Parallel Order Block Jacobi method variant, and the Parallel Order Block Jacobi method variant calls a fourth Jacobi method variant 280 configured to perform a batch eigenvalue solver using a Parallel Order Jacobi method variant.

After the batch eigenvalue solver performs the Parallel Order Jacobi method variant on a subproblem received from the third Jacobi method variant 275, the fourth Jacobi method variant 280 passes the results of the batch eigenvalue solver back to the third Jacobi method variant 275, and the third Jacobi method variant 275 performs the Parallel Order Block Jacobi method variant. The results of the Parallel Order Block Jacobi method variant are passed to the second Jacobi method variant 270, which performs a Classical Block Jacobi method variant on a subproblem. These results are provided to the first Jacobi method variant 265, which performs the Schur decomposition and column and row updates of the symmetric matrix 250, and the above steps may be repeated iteratively until a convergence condition is reached.

According to some embodiments, when only a single GPU is available for performing transformations of the symmetric matrix 250, the first Jacobi method variant 265 is skipped, and the method 290 includes performing the Jacobi method variants 270, 275 and 280.

In one example, for a matrix of size n=5000, kernel method syevj_large is called. The kernel method syevj_large performs a Classical Block Jacobi method variant and calls syevj_medium to perform a Parallel Order Block Jacobi method variant on a sub-problem of the matrix where 32<n≤4096. The Parallel Order Block Jacobi method variant calls a syevj_batch to perform a Parallel Order Jacobi method variant on another sub-problem of the matrix where n≤32. As described above, the kernel method results are passed back up to the calling kernel method, and the steps may be repeated iteratively until a convergence condition is reached.

Figure 2B:
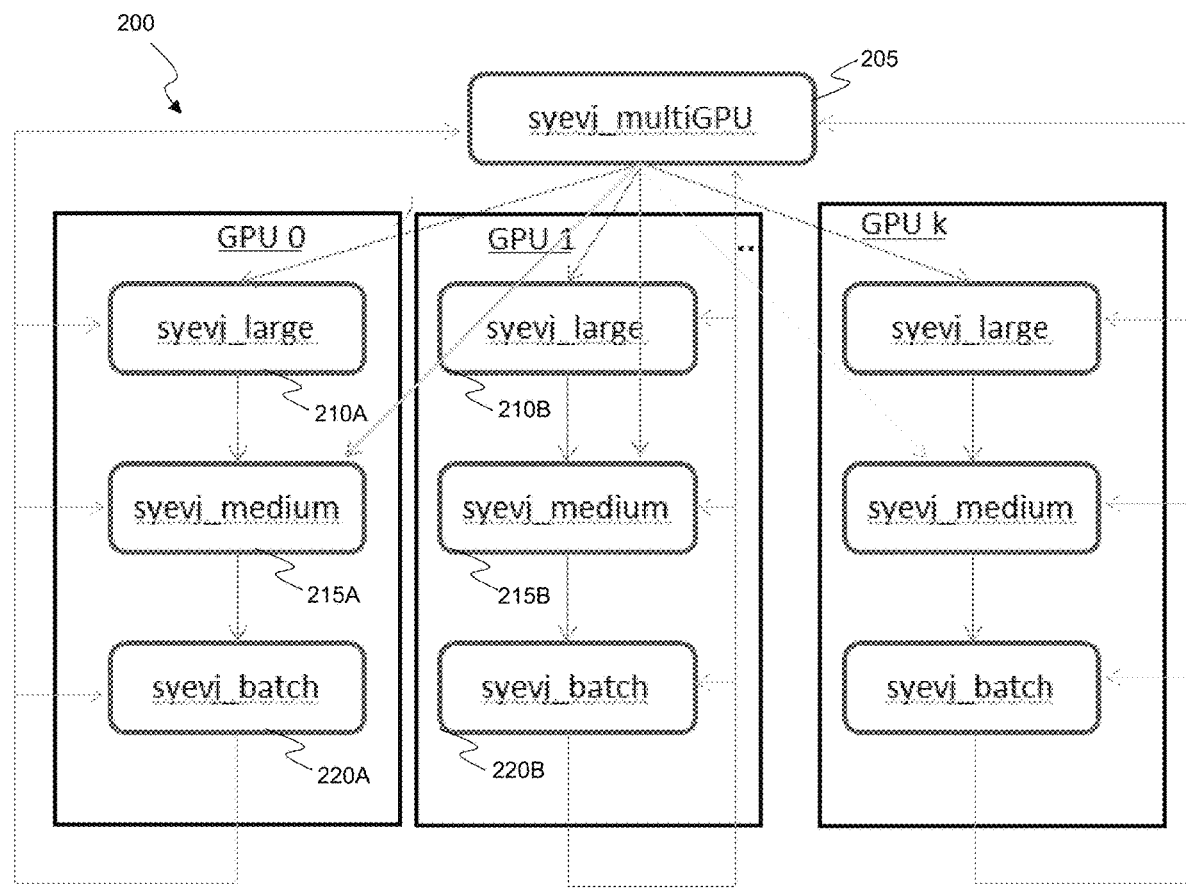
FIG. 2B is a flow-chart depicting an exemplary sequence of computer-implemented steps for performing a multi-GPU hierarchical Jacobi method according to embodiments of the present invention and also illustrates a hierarchical architecture of the novel solver.

With regard to FIG. 2B, an exemplary sequence of computer-implemented steps for performing a multi-GPU hierarchical Jacobi method 200 for leveraging memory hierarchy and parallel processing of a multi-core processor (e.g., a GPU) is depicted according to embodiments of the present invention. The hierarchical Jacobi method 200 (or hierarchical architecture) in accordance with embodiments of the present invention combines several different variations of the Jacobi method, including Block Jacobi, Classical Jacobi and Parallel Order Jacobi, into a hierarchical model that reduces overall computation costs. Specifically, embodiments of the hierarchical Jacobi methods disclosed herein offer controllability of Schur decomposition, robust tolerance for passing data throughout the hierarchy, and significant cost reduction on row updates compared to existing methods. These functionalities will be discussed further below in detail.

More specifically, embodiments of the hierarchical method 200 leverage memory hierarchy and parallel processing to implement four levels of hierarchy, where different levels are utilized based on the problem (or subproblem) size. Specifically, four different Jacobi kernel methods syevj_batch, syevj_medium, syevj_large, and syevj_multiGPU are used to form the hierarchy 200, and to target different pre-defined problem sizes which are defined by a set of thresholds. In general, the higher level Jacobi kernel methods (e.g., syevj_large) call the lower level Jacobi kernel methods (e.g., syevj_medium), as depicted in, and summarized in, FIG. 2B, as well as Table I below. The threshold sizes shown in Table 1 are merely exemplary.

TABLE I

| Region of Interest or Threshold | Routine | Description |
| --- | --- | --- |
| 8192 < n ≤ 65536 | syevj_multiGPU (265) | A variant of Classical Block Jacobi which calls syevj_medium or syevj_large. This is a Multi-GPU solution which overlaps communication and computation to achieve strong scaling performance. |
| 4096 < n ≤ 8192 | syevj_large (270) | Classical Block Jacobi which calls syevj_medium. Searching for largest off-diagonal is not an issue due to large tile size. |
| 32 < n ≤ 4096 | syevj_medium (275) | Parallel Order Block Jacobi of block size 16 which calls syevj_batch to perform Schur decomposition, and uses modified GEMM for row and column update on matrix A and V. |
| n ≤ 32 | syevj_batch (280) | A batched Parallel Order Jacobi performed on a 32-by-32 matrices. Utilizes on-chip shared memory to make the problem computational intensive and is able to fully utilize the GPU. |

Kernel method syevj_multiGPU is based on the Classical Block Jacobi, which calls syevj_medium or syevj_large depending on the size of the subproblem, and is positioned at the top of the hierarchical Jacobi method 200. Kernel method syevj_multiGPU is a multi-GPU solution which overlaps communication and computation to achieve strong scaling. The boundary (e.g., problem size or "threshold") of the levels of the hierarchical method 200 are determined based on the memory capacity and processing power of the associated many-core processor, as well as the communication overhead between the device and the host.

Referring again to FIG. 2B, at step 205, kernel method syevj_multiGPU is called to perform a variant of Classical Block Jacobi for a matrix A and eigenvectors V using a block size of 1024 (matrix size). Depending on the subproblem size, syevj_multiGPU is configured to call syevj_large of GPU0 at step 210A for subproblem sizes between 4096 and 8192, or syevj_medium of GPU0 at step 215A for subproblem sizes between 32 and 4096. Moving down the hierarchy of FIG. 2B, Kernel method syevj_large calls syevj_medium of GPU0 at step 215A, and syevj_medium calls syevj_batch of GPU0 at step 220A. Each kernel method is configured to process a subproblem (e.g., a Schur decomposition of a submatrix in one example) and return the result to the calling kernel method. In this way, the results are iteratively passed up the hierarchical method 200 until a convergence condition is reached in accordance with the solver.

The work performed within the hierarchical architecture 200 may be performed by multiple GPUs in parallel. Other available multi-core GPUs may be called to perform calculations of the hierarchical Jacobi method 200 in parallel with other processors. For example, syevj_multiGPU may gather all work to be performed in parallel and assign a first set of work to be performed by GPU0, a second set of work to be performed by GPU1, and so on, for each GPU of the k GPUs.

In the same way as described above with regard to GPU0, depending on the subproblem size, syevj_multiGPU is configured to call syevj_large of GPU1 at step 210B for subproblem sizes between 4096 and 8192, or syevj_medium of GPU1 at step 215B for subproblem sizes between 32 and 4096. Moving down the hierarchy of FIG. 2B, Kernel method syevj_large calls syevj_medium of GPU1 at step 215B, and syevj_medium calls syevj_batch GPU1 at step 220B. Additional GPUs may be configured in the same way.

The Jacobi method variations included in Table I are described in more detail below according to embodiments of the present invention.

Batch Eigenvalue Solver (Svevj_Batch)

At the lowest level of the hierarchical Jacobi method, the kernel method syevj_batch performs Parallel Order Jacobi on matrices of a first threshold size, e.g., size 32-by-32 (for instance) or less. According to some embodiments, this kernel method can be implemented using 512 threads within a thread block to form 16 concurrent vectors, each vector having 32 threads. Kernel method Syevj_batch may be configured to execute Algorithm 1 shown below in pseudo-code form.

---

Exemplary Algorithm 1: syevj_batch(pseq, qseq, top, bot, A, maxite, eps, $V_b$, steps)

(1) ~~eps = tol · ‖A‖_F~~

(2) $\text{eps}_{A_{pq}} = \dfrac{\text{eps}}{\sqrt{32(32-1)}}$ (3) p = pseq(cta_id); q = qseq(cta_id)

(4) load $\begin{pmatrix} A_{pp} & A_{pq} \\ A_{qp} & A_{qq} \end{pmatrix}$ to shared memory As which is 32-by-32.

(5) Load top, bot to shared memory
(6) $V_s$ = eye(n) is on shared memory.
(7) ~~top = 1:2:32; bot = 2:2:32~~
(8) for ite =0:maxite-1
(9)   If off (A) ≤ eps, break
(10)  for set = 1:31
(11)    // each k-th vector performs the following operations
(12)    p = min(top(set, k), bot(set, k))
(13)    q = min(top(set, k), bot(set, k))
(14)    If ($a_{pq} >> \text{eps}_{A_{pq}}$)
(15)      (c, s) = sym.schur2($A_s$, p, q) // compute J(p, q, θ)
(16)      Column update $A_s(:, [p, q]) = A_s(:, [p, q]) \cdot J(p, q, \theta)$
(17)      Column update $V_s(:, [p, q]) = V_s(:, [p, q]) \cdot J(p, q, \theta)$
(18)    end // $a_{pp}$ > eps
(19)    synchronization
(20)    If ($a_{pq}$ > eps)
(21)      Row update $A_s([p, q], :) = J(p, q, \theta)^T \cdot A_s([p, q], :)$

---

Exemplary Algorithm 1: syevj_batch(pseq, qseq, top, bot, A, maxite, eps, $V_b$, steps)

(22)    end // $a_{pq}$ > eps
(23)    synchronization
(24)  ~~[top, bot] = music(top, bot, 32)~~
(25)  end // set = 1:31
(26) end // off(A) > eps
(27) $V_b$(0: 31, 0: 31, cta_id) := $V_s$
(28) steps(cta_id) = ite

---

It is appreciated that the lines of algorithms presented herein that are crossed out (e.g., lines 1, 7, and 24 of Algorithm 1) indicate that the step may be skipped or performed manually by the caller.

Syevj_batch (220A, 220B of FIG. 2B) is a generally basic routine for performing Schur decomposition for syevj_medium, which executes Parallel Order Block Jacobi with the block size set to 16. The Schur decomposition performs:

$$\begin{pmatrix} V_{pp} & V_{pq} \\ V_{qp} & V_{qq} \end{pmatrix}^T \begin{pmatrix} A_{pp} & A_{pq} \\ A_{qp} & A_{qq} \end{pmatrix} \begin{pmatrix} V_{pp} & V_{pq} \\ V_{qp} & V_{qq} \end{pmatrix} = \begin{pmatrix} D_{pp} & \\ & D_{qq} \end{pmatrix},$$

where $A_{pp}$, $A_{pq}$, $A_{qp}$, $A_{qq}$, $V_{pp}$, $V_{pq}$, $V_{qp}$ and $V_{qq}$ are 16-by-16 sub-matrices.

Each pair of blocks (p, q) from syevj_medium is unique to a specific iteration, where subsequent iterations use different (p, q) block pairs, and the Schur decompositions are performed in parallel. Accordingly, parameters (pseq, qseq) are determined to compute which Schur decomposition to solve.

The Parallel Order Block Jacobi uses a round-robin ordering. The round-robin ordering used by Parallel Order Block Jacobi may be set in advance or computed in-flight, and the results are stored into parameters top or bot, which are 16-by-31 arrays. Accordingly, line 7 and line 24 of syevj_batch used for generating the ordering (e.g., permutations) may be skipped to improve performance because these computations are sequential. Instead, a pre-computed table of data may be used to store the permutations, and line 7 and line 24 do not need to be performed in-flight. If performed inflight, line 7 and line 24 may require stalling all threads, resulting in a relatively large latency penalty.

A parameter maxite is included to control the number of iterations performed. The caller of syevj_batch can select the number of iterations desired using maxite, so instead of diagonalization of $$\begin{pmatrix} A_{pp} & A_{pq} \\ A_{qp} & A_{qq} \end{pmatrix},$$

syevj_batch performs:

$$\begin{pmatrix} V_{pp} & V_{pq} \\ V_{qp} & V_{qq} \end{pmatrix}^T \begin{pmatrix} A_{pp} & A_{pq} \\ A_{qp} & A_{qq} \end{pmatrix} \begin{pmatrix} V_{pp} & V_{pq} \\ V_{qp} & V_{qq} \end{pmatrix} = \begin{pmatrix} D_{pp} & D_{pq} \\ D_{qp} & D_{qq} \end{pmatrix}, D_{qp} \neq 0$$

As such, one iteration is enough for Schur decomposition of the subproblem. It should be appreciated that additional iterations of Schur decomposition of low level Jacobi variants do not substantially improve the number of iterations of the eigenvalue solver, but do dramatically increase the runtime of Schur decomposition.

Moreover, 16 vectors (e.g., 16 warps) are used to form a thread block. At this time, the occupancy of GPU can be at least 50%. The row and column updates use 32 rows or 32 columns to match the warp size. The value of eps=tol·$\|A\|_F$, is not computed directly, and instead, the value of eps is provided by the caller (syevj_medium). The kernel method syevj_batch computes $$eps_{Apq} = \frac{eps}{\sqrt{32(32-1)}}$$

to decide if $a_{pq}$ is numerical zero or not. The value of $eps_{Apq}$ is a termination condition of syevj_batch which guarantees progress of the algorithm. The parameters maxite (maximum number of iterations) and eps (tolerance) are included to provide a perfectly recursive structure with robust, adjustable tolerance for passing results layer-by-layer.

Figure 3:
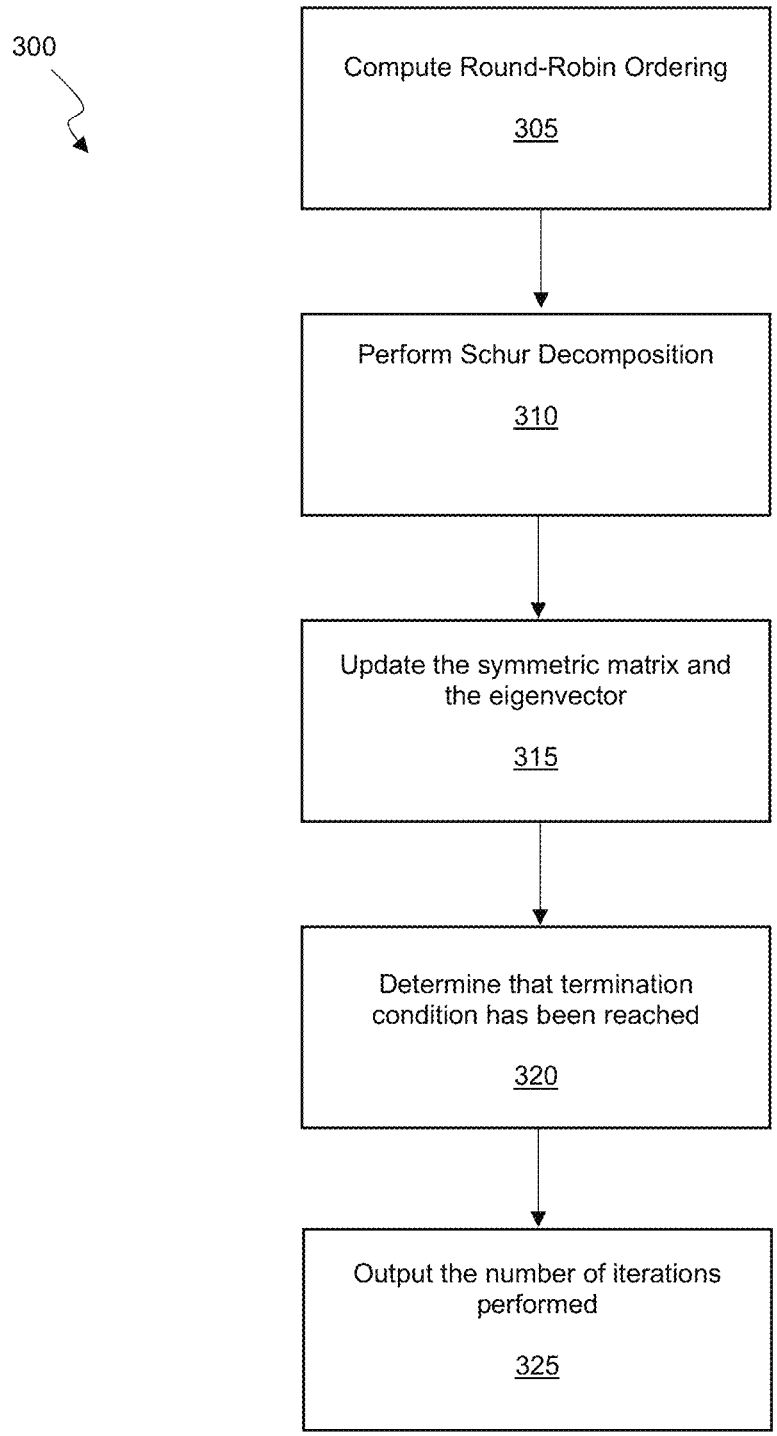
FIG. 3 depicts an exemplary sequence of computer implemented steps for executing a Batch Eigenvalue Solver according to embodiments of the present invention.

Exemplary steps of a computer implemented method 300 for executing a Batch Eigenvalue Solver are depicted in FIG. 3 according to embodiments of the present invention. At step 305, a round-robin ordering for performing Parallel Order Block Jacobi on a symmetric matrix, and the ordering is stored into an array. At step 310, the Batch Eigenvalue Solver performs at least one Schur decomposition on a subproblem, where the parameter maxite is used to control the number of iterations performed. At step 315, a thread block is formed using 16 vectors and is used to update the symmetric matrix and the eigenvector. At step 320, a tolerance value is provided to the Batch Eigenvalue Solver and used to evaluate a termination condition of the Batch Eigenvalue Solver. For example, the tolerance value may be provided by the calling function. At step 325, the number of iterations performed is output to the calling function. The number of iterations performed by syevj_batch indicates if the subproblem is nearly diagonal. When the number of iterations output is zero, the subproblem is nearly diagonal and the caller does not need to update the corresponding portion of the matrix and the eigenvectors. The above computer implemented steps may be repeated iteratively until a convergence condition is reached.

Parallel Order Block Jacobi (Syevj_Medium)

The overall performance of the Hierarchical Jacobi method 200 relies on its basic building blocks, and in one implementation requires a fast Jacobi method executed using multiple cores to solve a small matrix. Classical Jacobi alone may not be a good choice because it is sequential. Kernel method syevj_batch only works for very small matrices (e.g., 32-by-32), and is not efficient for a medium sized matrix (e.g., hundreds or thousands of rows) because the requirements of transferring data back and forth from global memory is far too expensive. However, modern "many-core" processors are often vector machines with fast on-chip memory, and therefore it is advantageous to apply Block Jacobi in order to harness fast on-chip memory, where all vectors can cooperate to solve a small block. Therefore, in Algorithm 2 executed by kernel method syevj_medium (215A, 215B), "Parallel Order Block Jacobi" having block size 16 is selected as a trade-off among the benefits and drawbacks of Classical Jacobi and Parallel Order Jacobi. This algorithm is show below as exemplary pseudocode.

Exemplary Algorithm 2: syevj_medium(n, A, maxite, eps, V, steps)

(1) ~~eps = tol · $\|A\|_F$~~
(2) V = eye(n)
(3) w = 16, and N = ⌈n/w⌉

(4) $eps_{Apq} = \frac{eps}{\sqrt{N(N-1)/2}}$ (5) form parallel ordering set (top32, bot32) for syevj_batch
(6) top = 1: 2: N; bot = 2: 2: N
(7) for ite =0:maxite-1
(8)   If off(A) ≤ eps, break
(9)   for set = 1:N-1
(10)    syevj_batch(top, bot, top32, bot32, A, 1, $eps_{Apq}$, $V_b$, steps)
(11)    column_rotate_batch(top, bot, A, V, $V_b$, steps)
(12)    row_rotate_batch_phase1(top, bot, A, $V_b$, steps)
(13)    row_rotate_batch_phase2(top, bot, A, $V_b$, steps)
(14)    [top, bot] = music(top, bot, N)
(15)   end // set = 1:N-1
(16) end // off(A) > eps
(17) steps = ite To implement Parallel Order Block Jacobi in accordance with one embodiment, all computations to be performed in parallel are gathered into a batched mode having three batched operations: a Schur decomposition operation, a column update operation for A and V, and a row update operation for A. Two parameters are provided by the caller: maxite, representing the maximum number iteration, and eps, representing the tolerance level. Only one iteration may be enough for Schur decomposition of a subproblem, and more iterations in Schur decomposition do not necessarily improve the number of outer sweeps. Rather, as mentioned above, further iterations may dramatically increase the runtime of Schur decomposition.

The tolerance value $$eps_{Apq} = \frac{eps}{\sqrt{N(N-1)}}$$

is computed and used as a termination condition in syevj_batch to guarantee the progress of the algorithm. Specifically, for any two layers in the hierarchical Jacobi method, the tolerance values provide a perfect recursive structure with robust adjustable tolerance for passing results between layers.

The first batched Schur decomposition syevj_batch is executed, and for each pair (p, q), syevj_batch returns a number of steps. If the number of steps is zero, then no Schur decomposition operation is performed for this (p, q) pair, and accordingly, no row or column update is performed for this pair. The batched column updates column_rotate_batch and the batched row updates row_rotate_batch_phase1/ row_rotate_batch_phase2 are performed using a custom GEMM. According to some embodiments, the symmetric property of matrix A may be used advantageously in row_rotate_batch_phase2 to reduce the cost of row update to roughly $\frac{1}{6}^{th}$ of the cost of performing column update in a multi-GPU Jacobi method.

As mentioned above, Syevj_batch returns steps, which indicates the number of iterations performed. If the value of steps is zero, then $$\begin{pmatrix} A_{pp} & A_{pq} \\ A_{qp} & A_{qq} \end{pmatrix}$$

is nearly diagonal because off(A)≤eps, so the caller can determine and select this property and avoid unnecessary computations where the Schur decomposition would not progress the algorithm. Therefore, in this case, A and V do not require updates. In other cases, such as when n≠wN, or when nearing convergence, A and V may be updated using zero padding, for example.

Figure 4:
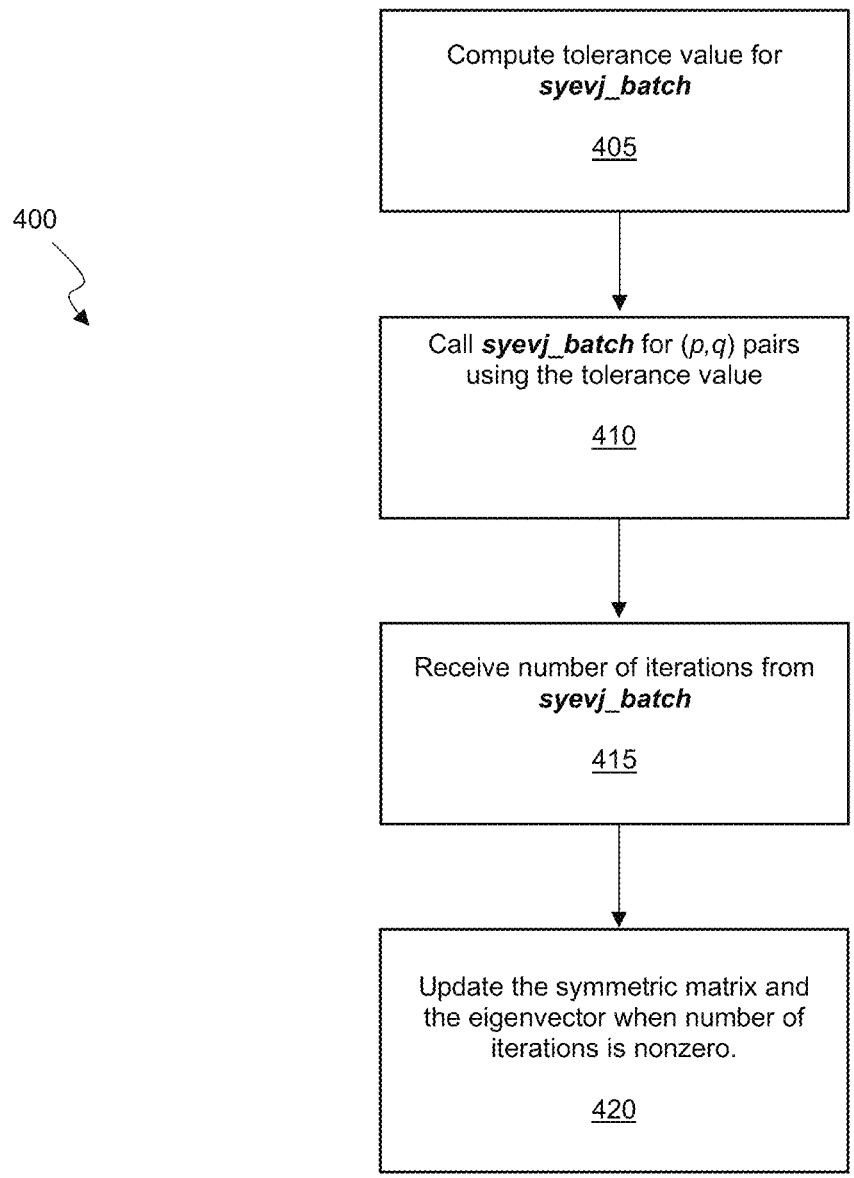
FIG. 4 depicts an exemplary sequence of computer implemented steps for executing a Parallel Order Block Jacobi method according to embodiments of the present invention.

Exemplary steps of a computer implemented method 400 for executing a Parallel Order Block Jacobi method are depicted in FIG. 4 according to embodiments of the present invention. At step 405, a tolerance value for calling syevj_batch to transform subproblems of symmetric matrix is computed. For example, the tolerance value may be computed using the equation $$eps_{Apq} = \frac{eps}{\sqrt{N(N-1)}},$$

where the value of $eps_{Apq}$ used as a termination condition for syevj_batch. At step 410, syevj_batch is called and performs transformations on subproblems of the symmetric matrix using a number of iterations. At step 415, the number of iterations performed by syevj_batch is received. At step 420, the symmetric matrix and eigenvectors are updated when the number of iterations is nonzero. The above computer-implemented steps may be repeated iteratively until a convergence condition is reached.

Classical Block Jacobi (Syevj_Large)

When the dimensions of a matrix are larger than thousands, using syevj_medium can saturate a multi-core processor. However, it is well-known that performing row/column updates is highly dependent on the performance of GEMM, so achieving high performance of GEMM will further increase the overall performance of the algorithm. While syevj_medium uses a custom GEMM to perform row and column updates, this approach generally does not exceed the performance level of the highest performing GEMM. For example, the inner dimension of GEMM in syevj_medium is only 32, which is too small to achieve maximum performance.

Furthermore, in accordance with different implementations, the GEMM of syevj_medium is bounded by the available memory bandwidth; the GEMM of syevj_medium not bounded by the computing power of floating point operations. To utilize the full performance of GEMM, the inner dimension should be at least 512. Moreover, one large block in Block Jacobi can saturate a typical GPU. Therefore, Classical Jacobi is sufficient, and there is no need to perform Parallel Order Jacobi, as Parallel Order Jacobi uses more iterations than Classical Jacobi. Therefore, in accordance with embodiments of the present invention, syevj_large (210A, 210B) provides a processing layer based on Classical Block Jacobi with block size 1024 as depicted in Exemplary Algorithm 3 shown in pseudocode below.

---

Exemplary Algorithm 3: syevj_large(n, A, maxite, eps, V, steps)

(1) ~~eps = tol · ||A||_F~~
(2) V = eye(n)
(3) w = 1024, and N = ⌈n/w⌉

---

Exemplary Algorithm 3: syevj_large(n, A, maxite, eps, V, steps)

(4) $eps_{Apq} = \frac{eps}{\sqrt{N(N-1)/2}}$ (5) for ite =0:maxite-1
(6)    If off(A) ≤ eps, break
(7)    Choose (p, q) so off($A_{pq}$) = $\max_{i \neq j}$\{off($A_{ij}$)\}

(8)    Gather $A_{sub} = \begin{pmatrix} A_{pp} & A_{pq} \\ A_{qp} & A_{qq} \end{pmatrix}$ (9)    syevj_medium(2*w, $A_{sub}$, 1, $eps_{Apq}$, $V_{sub}$, steps)

(10)   If (0 != steps) scatter $A_{sub}$ back to $\begin{pmatrix} A_{pp} & A_{pq} \\ A_{qp} & A_{qq} \end{pmatrix}$

(11)   If (0 != steps)
(12)      row_column_rotate(p, q, A, V, $V_{sub}$)
(13)   end
(14)   Update off($A_{ij}$)
(15) end // off(A) > eps
(16) steps = ite

---

Syevj_large executes syevj_medium to perform a 2048-by-2048 (for instance) sized Schur decomposition. The kernel method syevj_medium may be executed multiple times, and each time a single iteration is performed. After the Schur decomposition, the updated $A_{sub}$ is copied back to $$\begin{pmatrix} A_{pp} & A_{pq} \\ A_{qp} & A_{qq} \end{pmatrix}.$$

Therefore, these four blocks do not need to be computed again during the row/column update of A. The row and column updates are combined together, and a transpose operation is performed to take advantage of the symmetry of $A_{sub}$, instead of performing GEMM for the row update.

Next, off($A_{ij}$) is updated, where off($A_{ij}$) is a square sum of diagonal elements represents a value used to determine convergence of a Jacobi algorithm. One drawback of Classical Jacobi is that searching for the largest off-diagonal entry is relatively expensive. However, for kernel method syevj_large, searching for the largest off-diagonal entry advantageously requires only $O(N^2)$, and only includes updating off($A_{ij}$) in two row blocks, further increasing performance. The parameter steps is returned by kernel method syevj_medium to determine if A and V require updates, which avoids performing unnecessary computations.

More specifically, off($A_{ij}$) may be defined as:

$$off(A) = \|A - diag(A)\|_F = \sqrt{\sum_{i=1}^{n} \sum_{j=1, j \neq i}^{n} a_{ij}^2}$$

The value of off(A)=0 indicates that matrix A is diagonal, and contains the eigenvalues of A. For example, for a matrix A, the Jacobi method iteratively transforms matrix A into a diagonal matrix A($=A_0$)→$A_1$→$A_2$→$A_3$→ . . . →$A_k$. According to the monotone property of the Jacobi algorithm, off(A)>off($A_1$)>off($A_2$)>off($A_3$)> . . . >off($A_k$); however, the convergence rate differs from case to case. For example, 14 or 15 iterations may be performed for 14 digits accuracy.

Line 3 of Algorithm 3 describes the block dimension w, which is set to 1024, and the number of blocks N, which is equal to matrix dimension n divided by w. If the dimension of A is 8196, and N=8196/1024=8 (8 row/column blocks), line 5 of Algorithm 3 performs iterations until the convergence criteria is met in line 6. Computation of off(A) for the entire matrix A can be skipped because it is very expensive. Instead, off(Aij) is computed for each block (i, j). For example, in this case there are (8*8−8)=56 off-diagonal blocks, so off(Aij) must be computed 56 times. At each iteration, only the largest off(Aij) is picked up (see line 7), and the (p,q) pair is processed by syevj_medium. Subsequently, line 8 gathers a submatrix (p,q) pair from A, and Line 9 computes Schur decomposition of the matrix in line 8 by syevj_medium. Assuming (p,q)=(3, 5), after syevj_medium, the updated submatrix is copied back to the original matrix A (see line 10). Row blocks 3 and 5 and column block 3 and 5 are updated (see line 11). Line 14 updates off($A_{ij}$) on row block 3 and 5, and column block 3 and 5 only because other portions of the matrix are not modified.

Figure 5:
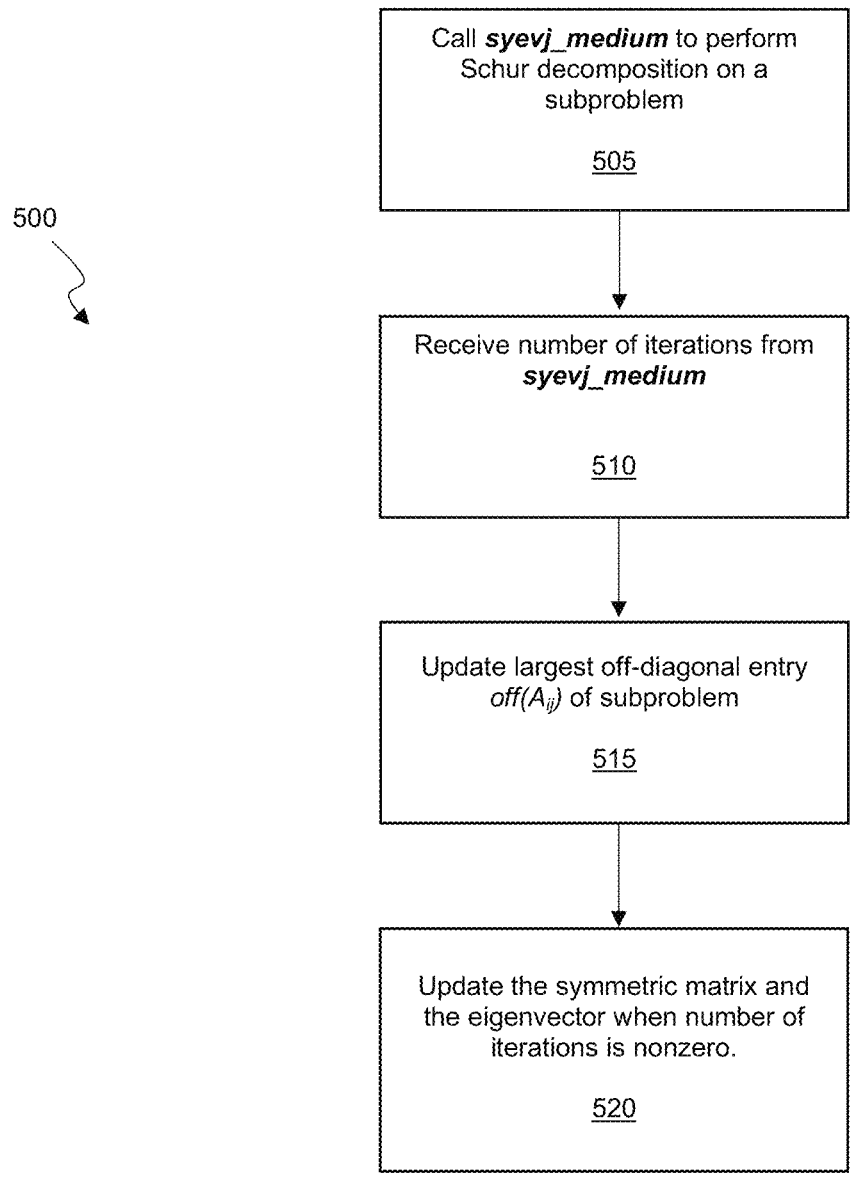
FIG. 5 depicts an exemplary sequence of computer implemented steps for executing a Classical Block Jacobi method according to embodiments of the present invention.

Exemplary steps of a computer implemented method 500 for executing a Classical Block Jacobi method are depicted in FIG. 5 according to embodiments of the present invention. At step 505, the kernel method syevj_medium is called to perform a Schur decomposition on a subproblem of a symmetric matrix. At step 510, the number of Schur decomposition iterations performed is returned by syevj_medium. At step 515, the largest off-diagonal entry off($A_{ij}$) of the subproblem is computed. At step 520, the symmetric matrix A and eigenvectors V are updated when the number of Schur decomposition iterations performed is nonzero; otherwise, the above computer implemented steps may be repeated iteratively until a convergence condition is reached.

Classical Block Jacobi (Syevj_Mulitgpu)

Kernel method syevj_multiGPU (205) is positioned at the top of the hierarchical method 200 (FIG. 2B) and may be used when multiple GPUs are available for performing work in parallel. Kernel method syevj_multiGPU employs Classical Block Jacobi to harness the natural parallelism of the Jacobi method. Several (p, q) values are selected within each iteration, and each available GPU computes one Schur decomposition. As set forth in Algorithm 4 below, for a matrix A and eigenvectors V residing on a host, the matrices A and V are tiled into an N-by-N block, where each block is 1024-by-1024, for example, to reduce communication overhead.

Importantly, the selected block size is a tradeoff between communication cost and computation performance. It is often preferable to overlap communication with computation by selecting a block size w such that the cost of data transfer is approximately equal to the cost of GEMM. Accordingly, when the bandwidth of PCI transfers increases, w increases, and when the performance of GEMM increases, w decreases. Therefore, any time the performance of GEMM or the bandwidth of data transfer is measured, the block size w may be adjusted accordingly.

The function performed by kernel method syevj_multiGPU in Algorithm 4 takes arguments (n, A, maxite, eps, V, steps), where the values of eps and maxite may be provided by the caller. As described above regarding syevj_medium, the value of eps represents the threshold for convergence (e.g., tolerance), the value of maxite represents the maximum number of iterations to be performed, and the value of steps represents the number of sweeps performed.

The kernel method syvej_multiGPU may use the following exemplary pseudocode implementation of Algorithm 4, where η GPUs are available, and η≤N/2:

Exemplary Algorithm 4: syevj_multiGPU(n, A, maxite, eps, V, steps)

(1) eps = tol · $\|A\|_F$
(2) w = 1024, and N = ⌈n/w⌉
(3) V = eye(n) in N − by − N blocks
(4) tile A to N − by − N blocks (5) $eps_{Apq} = \dfrac{eps}{\sqrt{N(N-1)/2}}$ (6) for ite =0:maxite-1
(7)    If off(A) ≤ eps, break
(8)    Algorithm : choose a sequence {($p_k$, $q_k$): k = 1, 2, . . . , η, and $p_i \neq q_j$} such that off(A($p_k$, $q_k$)) ≥ off(A($p_{k+1}$, $q_{k+1}$))
(9)    #pragma omp parallel for
(10)   for k = 1: η

(11)        Gather $A_{sub} = \begin{pmatrix} A_{p_k,p_k} & A_{p_k,q_k} \\ A_{q_k,p_k} & A_{q_k,q_k} \end{pmatrix}$

(12)        syevj_medium(2*w, $A_{sub}$, 1, $eps_{Apq}$, $V_{sub}$, steps)

(13)        Scatter $A_{sub}$ back to $\begin{pmatrix} A_{p_k,p_k} & A_{p_k,q_k} \\ A_{q_k,p_k} & A_{q_k,q_k} \end{pmatrix}$

(14)        Compute off($A_{p_k,p_k}$), off($A_{q_k,q_k}$) and $\|A_{p_k,q_k}\|_F$
(15)   end
(16)   #pragma omp parallel for
(17)   for k =1: η
(18)        If(0 != steps) column_update ($p_k$, $q_k$, A, $A_{sub}$, $V_{sub}$)
(19)   end
(20)   #pragma omp parallel for
(21)   for k = 1: η
(22)        If (0 != steps) row_update_phase1($p_k$, $q_k$, A, $V_{sub}$, off(A))
(23)   end
(24)   #pragma omp parallel for
(25)   for k = 1: η
(26)        If (0 != steps) row_update_phase2($p_k$, $q_k$, A, $V_{sub}$)
(27)   end
(28) end // off(A) > eps
(29) steps = ite Line 8 in Algorithm 4 uses Algorithm 5 to compute {($p_k$, $q_k$):k=1, 2, . . . η,} where each iteration uses a unique (p, q) pair. In one implementation, this computation can be performed using a flag array, for example. It is appreciated that the cost to search ($p_k$, $q_k$) has been observed to be nearly zero.

Algorithm 5: find mutual exclusive ($p_k$, $q_k$)

(1)    flag := zeros(N,1)
(2)    f($A_{pq}$) = $\max_{i \neq j}$ {off($A_{ij}$)}, ($p_1$,$q_1$) = (p,q)
(3)    flag($p_1$) = 1, and flag($q_1$) = 1 // remove ($p_1$,$q_1$)
(4)    for k=2: η
(5)        off($A_{pq}$) = $\max_{i \neq j}$ {off($A_{ij}$): flag(i) = 0, and flag(j) = 0}, ($p_k$,$q_k$) = (p,q)
(6)        flag($p_k$) = 1, and flag($q_k$) = 1 // remove ($p_k$,$q_k$)
(7)    end Following Line 8, OpenMP (omp) is executed to perform Schur decomposition, for example, using one thread per GPU. After Schur decomposition, column_update computes:

$$(\tilde{A}_{jp} \ \tilde{A}_{jq}) := (A_{jp} \ A_{jq}) \begin{pmatrix} V_{sub,pp} & V_{sub,pq} \\ V_{sub,qp} & V_{sub,qq} \end{pmatrix}, \text{ for } j \neq p, q$$

$$(\tilde{V}_{jp} \ \tilde{V}_{jq}) := (V_{jp} \ V_{jq}) \begin{pmatrix} V_{sub,pp} & V_{sub,pq} \\ V_{sub,qp} & V_{sub,qq} \end{pmatrix}.$$

Figure 7:
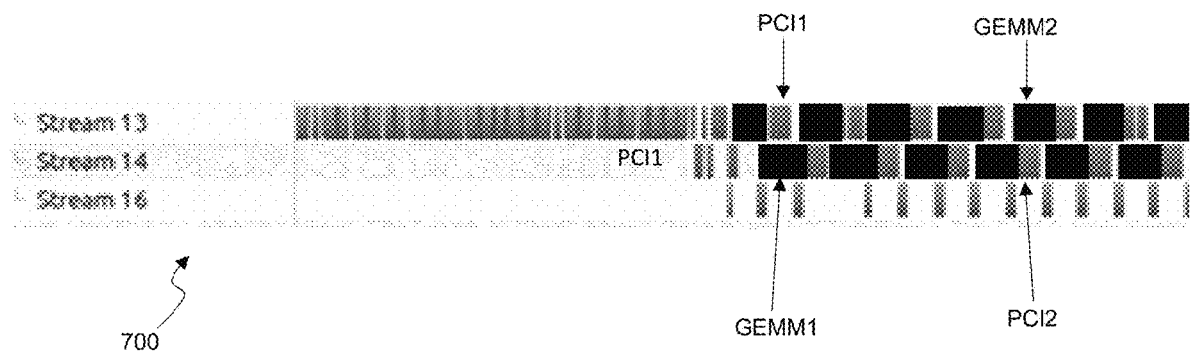
FIG. 7 depicts an exemplary project schedule for an exemplary symmetric matrix A stored in tiles according to embodiments of the present invention.

As depicted in FIG. 7, according to some embodiments of the present invention, PCI communication and computation of GEMM can overlap because A is already stored in tiles. Performing overlapping communication and computation of GEMM in this way improves the overall performance of the method, as the runtime of GEMM is longer than the time required to transfer data through PCI, so the GEMM computation hides the PCI transfer time well. FIG. 7 depicts an exemplary Gantt Chart 700 showing results of kernel method syevj_multiGPU executed on an 8192-by-8192 sized matrix (for instance) using a single exemplary GPU according to embodiments of the present invention. Operation GEMM1 of stream 14 overlaps with PCI transfer PCI1, and operation GEMM2 of Stream 13 overlaps with PCI transfer PCI2. At line 12, syevj_medium or syevj_large is called depending on the problem size.

The row updates for syevj_multiGPU include two phases. Row update phase 1 performs:

$$\begin{pmatrix} \tilde{A}_{pj} \\ \tilde{A}_{qj} \end{pmatrix} := \begin{pmatrix} V_{sub,pp} & V_{sub,pq} \\ V_{sub,qp} & V_{sub,qq} \end{pmatrix}^T \begin{pmatrix} A_{pj} \\ A_{qj} \end{pmatrix}, \text{ for } p < j \neq q.$$

Row update phase 1 only writes $\tilde{A}_{pj}$ back to $A_{pj}$ if p<j, and only writes $\tilde{A}_{qj}$ back to $A_{qj}$ if q<j. In other words, only the upper triangle of matrix A is updated. Row update phase 1 also updates off ($A_{ij}$), and row update phase 2 updates the lower triangular part of A by the symmetry property. Computation of row update using the symmetry property in this way has roughly ⅙ the cost of column update using syevj_multiGPU.

Figure 6:
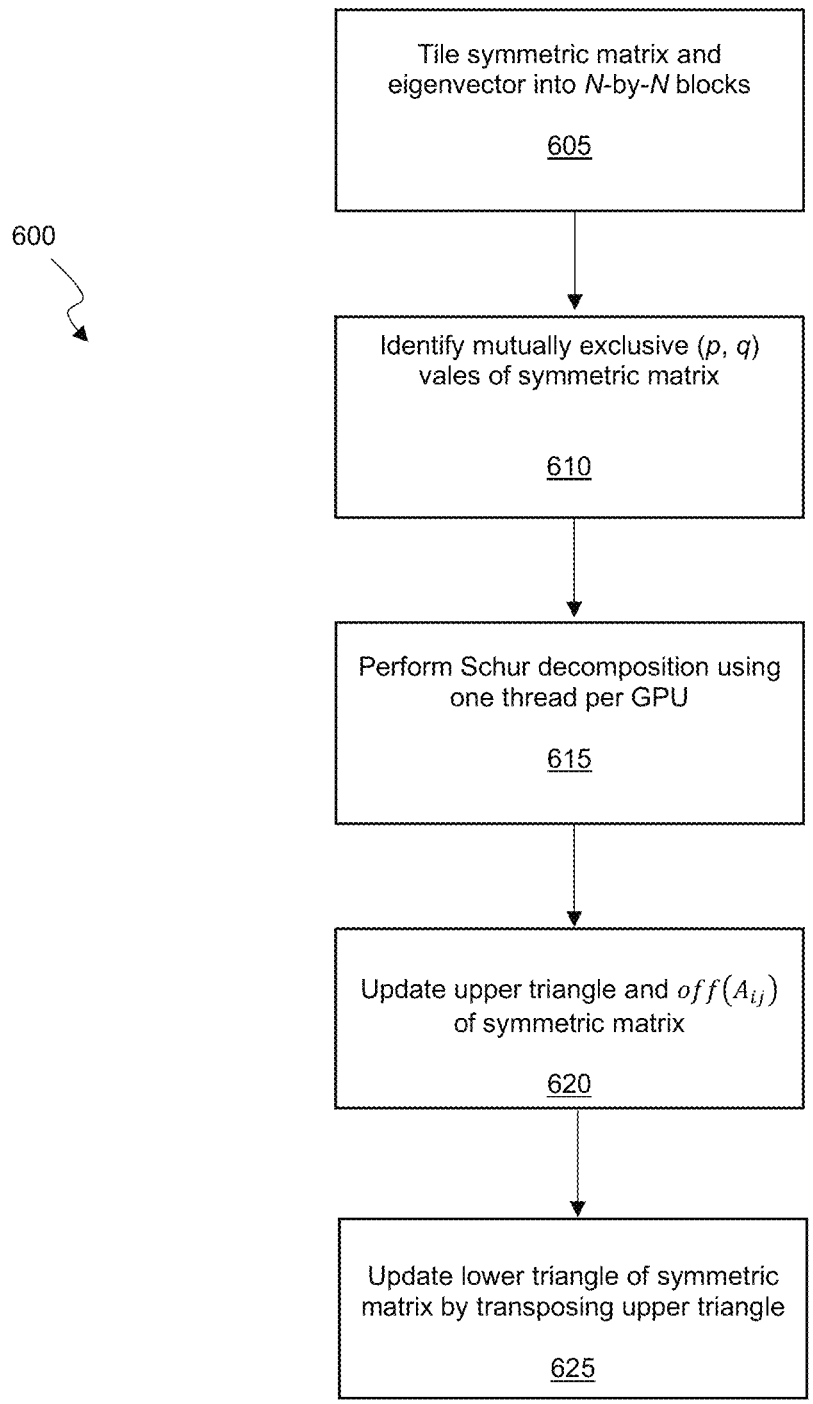
FIG. 6 depicts an exemplary sequence of computer implemented steps for executing a multi-GPU Classical Block Jacobi according to embodiments of the present invention.

Exemplary steps of a computer implemented method 600 for executing a multi-GPU Classical Block Jacobi method are depicted in FIG. 6 according to embodiments of the present invention. At step 605, a symmetric matrix A and eigenvectors V are tiled into N-by-N blocks (e.g., 1024-by-1024 blocks), which mitigates communication overhead for transferring data between the host and a GPU. At step 610, mutually exclusive (p, q) values of the symmetric matrix are computed using a flag array, for example. At step 615, a Schur decomposition is performed using one thread per available GPU, for example, using the function OpenMP. The Schur decomposition may be performed such that the communication (e.g., PCI data transfers) and GEMM computations overlap because the symmetric matrix is already divided into tiles. At step 620, the upper triangle portion of the symmetric matrix and off($A_{ij}$) are updated. At step 625, the lower triangle portion of the symmetric matrix is updated using the symmetry property of the symmetric matrix, for example, by transposing the upper triangle portion that has already been updated.

Hierarchical Jacobi Method Distinctions

Embodiments of the hierarchical Jacobi methods described herein provide several advantages and improvements over existing techniques for implementing the Jacobi method and variants thereof. These aspects of the invention have been described above with respect to specific algorithms and are described herein in greater detail.

Schur Decomposition of Subproblem One Iteration is Sufficient

As mentioned above with regard to kernel methods syevj_batch and syevj_medium, a single iteration is sufficient for Schur decomposition of a subproblem. As mentioned above, additional iterations of Schur decomposition of low level Jacobi variants do not substantially improve the number of iterations of the eigenvalue solver, but do dramatically increase the runtime of Schur decomposition. Although there is no formal proof of quadratic convergence using this modification, the following heuristic argument explains the approach. In general, quadratic convergence occurs if every off-diagonal entry of A is touched in one sweep. In block Jacobi, this means one iteration of syevj_batch is enough to touch every off-diagonal entry of A. Further, there is not a great difference in performance, even when syevj_batch reaches:

$$\begin{pmatrix} V_{pp} & V_{pq} \\ V_{qp} & V_{qq} \end{pmatrix}^T \begin{pmatrix} A_{pp} & A_{pq} \\ A_{qp} & A_{qq} \end{pmatrix} \begin{pmatrix} V_{pp} & V_{pq} \\ V_{qp} & V_{qq} \end{pmatrix} = \begin{pmatrix} D_{pp} & \\ & D_{qq} \end{pmatrix}.$$

Robust Tolerance for Passing Down Subproblems

A robust tolerance ensures that the algorithm progresses and the tolerance is tight. Moreover, the tolerance can be adjusted so that the hierarchical Jacobi method is easy to implement in different situations. For example, line 2 of Algorithm 1 (syevj_batch) computes a new tolerance $$eps_{Apq} = \frac{eps}{\sqrt{32 * 31}}$$

which is a termination condition in syevj_batch. This condition guarantees progress of the algorithm. With regard to Exemplary Algorithm 2, if off(A)>eps, then there exists one subproblem $$\hat{A} = \begin{pmatrix} A_{pp} & A_{pq} \\ A_{qp} & A_{qq} \end{pmatrix}$$

such that is $$\text{off}(\hat{A}) > \frac{\varepsilon}{\beta}, eps_{Apq} = \frac{\varepsilon}{\beta}$$

is passed to syevj_batch. Therefore, the condition off(A)≤eps in syevj_batch is actually $$\text{off}(\hat{A}) \leq \frac{\varepsilon}{\beta}.$$

For at least one subproblem that does not satisfy the condition $$\text{off}(\hat{A}) \leq \frac{\varepsilon}{\beta},$$

the subproblem can be progressed, and therefore off(A) must decrease. This holds for any two layers of the hierarchical Jacobi method, and provides a perfectly recursive structure with robust adjustable tolerance for passing down subproblems. The tolerance can be adjusted using two parameters maxite (maximum number of iterations) and eps (tolerance) in syevj_medium and syevj_batch.

Symmetry Property for Row Update

Figure 8:
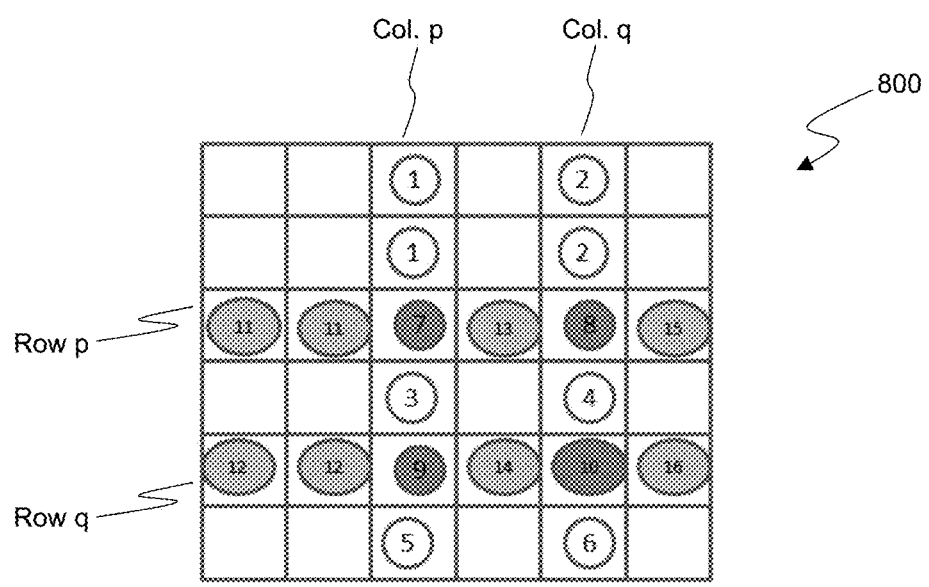
FIG. 8 illustrates an exemplary update sequence using the symmetry property according to embodiments of the present invention.

In accordance with embodiments of the present invention, the computational complexity of row update is reduced by the symmetry property of symmetric matrices, where the cost of a row update is roughly $\frac{1}{6}^{th}$ that of column update in syevj_multiGPU. The matrix A is symmetric when $a_{ij}=a_{ji}$ in a scalar sense, or $A_{ij}=A^T_{ji}$ in a block sense. As mentioned above, this symmetry property may be used to reduce the computations of row updates, including the row updates of syevj_medium, syevj_large and syevj_multiGPU. For example, in Exemplary Algorithm (syevj_large), each iteration only selects one pair (p, q) with max{off($A_{ij}$):i<j}. As depicted in FIG. 8, so only row p, q and column p, q are touched. FIG. 8 illustrates an exemplary update sequence using the symmetry property, where after Schur decomposition, syevj_large scatters $A_{sub}$ back to $$\begin{pmatrix} A_{pp} & A_{pq} \\ A_{qp} & A_{qq} \end{pmatrix}.$$

For column update, in column block p and q, $$(A_{ip}\ A_{iq}) := (A_{ip}\ A_{iq}) \begin{pmatrix} V_{pp} & V_{pq} \\ V_{qp} & V_{qq} \end{pmatrix} \text{ for } i \neq p, q.$$

In row update, no GEMM is performed, instead $A_{p,j}:=A_{j,p}^T$ and $A_{q,j}:=A_{j,q}^T$ for j≠p, q. The complexity of $\{A_{p,j}:=A_{j,p}^T$ and $A_{q,j}:=A_{j,q}^T$ for j≠p,q} is O(2w(n−2w)), which is substantially cheaper than GEMM, which is O(4w²(n−2w)).

Update Off($A_{ij}$) Only if Necessary

The performance of the described methods is improved when the square sum of diagonal elements off($A_{ij}$) is only updated when necessary to avoid the drawbacks of Classical Jacobi. In Exemplary Algorithm (syevj_large), each iteration only selects one pair (p, q) with max{off($A_{ij}$):i<j}, so only row (p, q) and column (p, q) are modified. In other words, {$A_{ij}$:i,j∉{p,q}} is unchanged, and there is no need to compute off($A_{ij}$) again. Therefore, only off($A_{pj}$) and off($A_{qj}$) are computed. Moreover, only the upper triangular portion is updated because A is symmetric. The complexity of updating off($A_{ij}$) is bounded by O(2nw), and is substantially smaller than GEMM in column update, which is O(4nw²). As such, the cost of off($A_{ij}$) is negligible.

Update A and V Only if Necessary

Figure 9:
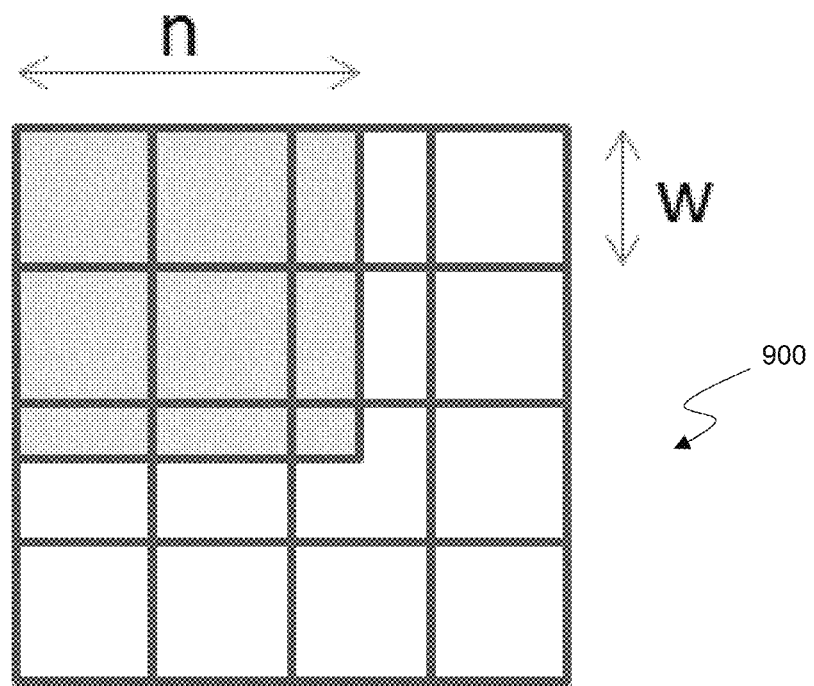
FIG. 9 depicts an exemplary 4-by-4 block according to embodiments of the present invention.

The matrix A and eigenvectors V are only updated when necessary in accordance with embodiments of the present invention. This reduces computation costs, not only near convergence, but also when matrix dimension n is not multiple of block dimension w. Specifically, syevj_medium, syevj_large and syevj_multiGPU include a parameter steps which is an output of a Schur decomposition. If the value of steps is zero, then the Schur decomposition does nothing. For example, if $$\begin{pmatrix} A_{pp} & A_{pq} \\ A_{qp} & A_{qq} \end{pmatrix}$$

is nearly diagonal, A and V do not need to be updated. This is most likely to occur near convergence, and may also occur when the dimension n is not a multiple of block size w, as depicted in FIG. 9. For the case of n≠wN, zero padding is performed. The worst case scenario occurs when $$\frac{n+w-1}{w}$$

is odd. FIG. 9 depicts an exemplary 4-by-4 block 900 of an exemplary dense symmetric matrix according to embodiments of the present invention, where n=4, and 2w<n<3w. If blocks (p, q)=(1, 4), for example, then there is no work to perform because $A_{pq}=A_{14}=0$, and therefore Schur decomposition returns steps=0. As such, no row/column update is performed.

Overview of Jacobi Methods for Dense Symmetric Eigenvalue Solvers

Three main approaches exist to diagonalize a symmetric matrix, in accordance with embodiments of the present invention. The approaches include: symmetric QR algorithm, spectrum method, and Jacobi method. In this section, the foundational Jacobi method and variants thereof are described according to alternative embodiments of the present invention.

The Jacobi method is a well-known technique for performing a sequence of similar transformation B:=J^T AJ, where J is referred to as a Jacobi rotation corresponding to a pair (p,q), where 1≤p<q≤n, and $$J \equiv J(p, q, \theta) = \begin{pmatrix} 1 & \cdots & 0 & \cdots & 0 & \cdots & 0 \\ \vdots & \ddots & \vdots & & \vdots & & \vdots \\ 0 & \cdots & c & \cdots & s & \cdots & 0 \\ \vdots & & \vdots & \ddots & \vdots & & \vdots \\ 0 & \cdots & -s & \cdots & c & \cdots & 0 \\ \vdots & & \vdots & & \vdots & \ddots & \vdots \\ 0 & \cdots & 0 & \cdots & 0 & \cdots & 1 \end{pmatrix}$$

In the Jacobi method, only column p, q and row p, q are updated, and cosine and sine are calculated to eliminate the off-diagonal term $b_{pq}$:

$$\begin{pmatrix} b_{pp} & b_{pq}=0 \\ b_{pq}=0 & b_{qq} \end{pmatrix} = \begin{pmatrix} c & s \\ -s & c \end{pmatrix}^T \begin{pmatrix} a_{pp} & a_{pq} \\ a_{pq} & a_{qq} \end{pmatrix} \begin{pmatrix} c & s \\ -s & c \end{pmatrix}$$

This simple rotation will reduce the "norm" of the off-diagonal elements. For example, if the "norm" of the off-diagonal elements is defined by $$f(A)=\|A-\text{diag}(A)\|_F=\sqrt{\Sigma_{i=1}^n \Sigma_{j=1,j\neq i}^n a_{ij}^2}, \text{ then:}$$
$$\text{off}(B)^2=\text{off}(A)^2-2a_{pq}^2.$$

Classical Jacobi selects the largest off-diagonal entry $a_{pq}$ (line 3 of The pseudocode of Algorithm below). If $S=\frac{1}{2}n(n-1)$, and $B:=J(p,q,\theta)^T \cdot A \cdot J(p,q,\theta)$, then $$\text{off}(B)^2 = \text{off}(A)^2 - 2a_{pq}^2 \le \left(1 - \frac{1}{s}\right)\text{off}(A)^2.$$

The cost of searching for the largest off-diagonal entry is one drawback of Classical Jacobi. For example, searching for the largest diagonal entry in line 3 of Algorithm 6 is $O(n^2)$.

As discussed above, several variants of the Jacobi method are disclosed herein, including Classical Jacobi, Parallel Order Jacobi, and Block Jacobi. Each variant of the Jacobi method is described with reference to an exemplary pseudo-code algorithm for executing the Jacobi method variant using a processor, such as a many-core GPU.

The pseudocode of Algorithm 6 represents another exemplary implementation of the Classical Jacobi method according to alternative embodiments of the present invention. Given a symmetric $A \in R^{n \times n}$ and a tolerance tol>0, Algorithm 6 overwrites A with $V^T A V$, where V is orthogonal and off($V^T A V$)≤tol·$\|A\|_F$

| Algorithm 6 - Classical Jacobi | |
|---|---|
| (1) | V = eye(n); eps = tol · $\|A\|_F$ |
| (2) | while off(A) > eps |
| (3) | choose (p, q) so $|a_{pq}| = \max_{i \ne j}|a_{ij}|$ |
| (4) | (c, s) = sym.schur2(A, p, q) // compute J(p, q, θ) |
| (5) | A = J(p,q,θ)$^T$ · A · J(p,q,θ) |
| (6) | V = V · J(p, q, θ) |
| (7) | end // off(A) > eps |

Regarding the quadratic convergence of Algorithm 6, it has been demonstrated that for large enough k, there is a constant c such that off($A^{(k+N)}$)≤c·off($A^{(k)}$)$^2$, and further, quadratic convergence has been established when A has distinct eigenvalues. $\frac{1}{2}n(n-1)$ Jacobi updates may be referred to as a "sweep". After some number of sweeps, quadratic convergence is observed on off(A). Although there is no rigorous theory on how many sweeps are needed to reach tolerance, even when quadratic convergence is known, 15 sweeps are typically sufficient for random matrices. It should be appreciated that quadratic convergence is only observed after each sweep, and that linear convergence is still observed for each iteration.

Parallel Order Jacobi

It is noted that there are $\frac{1}{2}n$ pairs of non-overlapped blocks (p, q) which can be processed in parallel because they operate on different columns and different rows. However, as there are $\frac{1}{2}n(n-1)$ combinations of blocks (p, q), Parallel Order Jacobi uses round-robin static ordering to cover these $\frac{1}{2}n(n-1)$ combinations in (n−1) iterations, where each iteration has $\frac{1}{2}n$ parallel jobs. Algorithm 7 represents a pseudo-code implementation of Parallel Order Jacobi according to alternative embodiments of the present invention. Given a symmetric matrix $A \in R^{n \times n}$ and a tolerance tol>0, Algorithm 7 overwrites A with $V^T A V$, where V is orthogonal and off($V^T A V$)≤tol·$\|A\|_F$. Algorithm 7 assumes that n is even, and line 5 through line 11 in Algorithm 7 may be performed in parallel.

Parallel Order Jacobi does not require searching for largest off-diagonal entry, which is an advantage over Classical Jacobi. While Parallel Order Jacobi is suitable for a many-core processor, it requires more sweeps than Classical Jacobi because it does not pick up a maximum off-diagonal entry at each iteration.

| Algorithm 7 - Parallel Order Jacobi | |
|---|---|
| (1) | V = eye(n); eps = tol · $\|A\|_F$ |
| (2) | top = 1:2:n; bot = 2:2:n |
| (3) | while off (A) > eps |
| (4) | for set = 1:n−1 |
| (5) | for k = 1:n/2 // all parallel |
| (6) | p = min(top(k), bot(k)) |
| (7) | q = min(top(k), bot(k)) |
| (8) | (c, s) = sym.schur2(A, p, q) // compute J(p, q, θ) |
| (9) | A = J(p, q, θ)$^T$ · A · J(p, q, θ) |
| (10) | V = V · J(p, q, θ) |
| (11) | end // k = 1:n/2 |
| (12) | [top, bot] = music(top, bot, n) |
| (13) | end // set = 1:n−1 |
| (14) | end // off(A) > eps |

Block Jacobi

The Jacobi method provides a recursive form such that several different layers of Jacobi method can be implemented, where a version of the Jacobi method is called at each layer. Such a recursive form of the Jacobi method is implemented in Block Jacobi, as described herein according to embodiments of the present invention. For example, where n=w*N, an n-by-n matrix A is partitioned as N-by-N tiles, each tile of size w-by-w:

$$A = \begin{pmatrix} A_{11} & \cdots & A_{1N} \\ \vdots & \ddots & \vdots \\ A_{N1} & \cdots & A_{NN} \end{pmatrix}$$

In Block Jacobi, the (p, q) block pair involves computation of a (2*w)-by-(2*w) Schur decomposition:

$$\begin{pmatrix} V_{pp} & V_{pq} \\ V_{qp} & V_{qq} \end{pmatrix}^T \begin{pmatrix} A_{pp} & A_{pq} \\ A_{qp} & A_{qq} \end{pmatrix} \begin{pmatrix} V_{pp} & V_{pq} \\ V_{qp} & V_{qq} \end{pmatrix} = \begin{pmatrix} D_{pp} & \\ & D_{qq} \end{pmatrix},$$

where $$\begin{pmatrix} V_{pp} & V_{pq} \\ V_{qp} & V_{qq} \end{pmatrix}$$

can be computed by calling the Jacobi method again.

Block Jacobi can be modified to include a framework based on Classical Jacobi or Parallel Order Jacobi. Typically, this is accomplished by replacing (c, s)=sym·schur2(A, p, q) (Step 8 in Algorithm 7) with a Schur decomposition:

$$\begin{pmatrix} V_{pp} & V_{pq} \\ V_{qp} & V_{qq} \end{pmatrix}^T \begin{pmatrix} A_{pp} & A_{pq} \\ A_{qp} & A_{qq} \end{pmatrix} \begin{pmatrix} V_{pp} & V_{pq} \\ V_{qp} & V_{qq} \end{pmatrix} = \begin{pmatrix} D_{pp} & \\ & D_{qq} \end{pmatrix},$$

and replacing $A=J(p,q,\theta)^T \cdot A \cdot J(p,q,\theta)$ using a column update:

$$A(:,[p,q]) = A(:,[p,q]) \cdot \begin{pmatrix} V_{pp} & V_{pq} \\ V_{qp} & V_{qq} \end{pmatrix},$$

followed by a row update:

$$A([p,q],:) = \begin{pmatrix} V_{pp} & V_{pq} \\ V_{qp} & V_{qq} \end{pmatrix}^T \cdot A([p,q],:),$$

where all operations are performed in a block sense.

Algorithms 8 and 9 are general extensions of Algorithm 6 and Algorithm 7 modified in the manner described above. Algorithm 8 represents a pseudocode implementation of Classical Block Jacobi, which is a version of Block Jacobi modified to include a Classical Jacobi basis. Given a symmetric $A \in R^{n \times n}$ and a tolerance tol>0, this algorithm overwrites A with $V^T AV$, where V is orthogonal and off $(V^T AV) \leq tol \cdot \|A\|_F$.

---
Algorithm 8 - Classical Block Jacobi
---

(1) V = eye(n); eps = tol · $\|A\|_F$
(2) while off(A) > eps
(3)    Choose (p, q) so off($A_{pq}$) = $\max_{i \neq j}$ {off($A_{ij}$)}

(4)    Gather subproblem $A_{sub} = \begin{pmatrix} A_{pp} & A_{pq} \\ A_{qp} & A_{qq} \end{pmatrix}$ (5)    Schur decomposition $$\begin{pmatrix} V_{pp} & V_{pq} \\ V_{qp} & V_{qq} \end{pmatrix}^T A_{sub} \begin{pmatrix} V_{pp} & V_{pq} \\ V_{qp} & V_{qq} \end{pmatrix} = \begin{pmatrix} D_{pp} & \\ & D_{qq} \end{pmatrix} \text{ update}$$

(6)    Column $A(:,[p,q]) = A(:,[p,q]) \cdot \begin{pmatrix} V_{pp} & V_{pq} \\ V_{qp} & V_{qq} \end{pmatrix}$ (7)    Row update $A([p,q],:) = \begin{pmatrix} V_{pp} & V_{pq} \\ V_{qp} & V_{qq} \end{pmatrix}^T \cdot A([p,q],:)$ (8)    Column update $V(:,[p,q]) = V(:,[p,q]) \cdot \begin{pmatrix} V_{pp} & V_{pq} \\ V_{qp} & V_{qq} \end{pmatrix}$ (9)    Update off($A_{ij}$), i ≠ j
(10) end // off(A) > eps

---

Algorithm 9 represents an exemplary pseudocode implementation of Parallel Order Block Jacobi, which is a version of Block Jacobi modified to include a Parallel Order Jacobi basis. Given a symmetric matrix $A \in R^{n \times n}$ and a tolerance tol>0, this algorithm overwrites A with $V^T AV$, where V is orthogonal and off$(V^T AV) \leq tol \cdot \|A\|_F$. It is assumed that n=w*N, and N must be even.

---
Algorithm 9 - Parallel Order Block Jacobi
---

(1) V = eye(n); eps = tol · $\|A\|_F$
(2) top = 1: 2: N; bot = 2: 2: N
(3) while off(A) > eps
(4)    for set = 1:N-1
(5)        for k =1:N/2 // all parallel ---
Algorithm 9 - Parallel Order Block Jacobi
---

(6)        p = min(top(k), bot(k))
(7)        q = min(top(k), bot(k))

(8)        Gather subproblem $A_{sub} = \begin{pmatrix} A_{pp} & A_{pq} \\ A_{qp} & A_{qq} \end{pmatrix}$ (9)        Schur decomposition $$\begin{pmatrix} V_{pp} & V_{pq} \\ V_{qp} & V_{qq} \end{pmatrix}^T A_{sub} \begin{pmatrix} V_{pp} & V_{pq} \\ V_{qp} & V_{qq} \end{pmatrix} = \begin{pmatrix} D_{pp} & \\ & D_{qq} \end{pmatrix}$$

(10)    Column update $A(:,[p,q]) = A(:,[p,q]) \cdot \begin{pmatrix} V_{pp} & V_{pq} \\ V_{qp} & V_{qq} \end{pmatrix}$

(11)    Row update $A([p,q],:) = \begin{pmatrix} V_{pp} & V_{pq} \\ V_{qp} & V_{qq} \end{pmatrix}^T \cdot A([p,q],:)$

(12)    Column update $V(:,[p,q]) = V(:,[p,q]) \cdot \begin{pmatrix} V_{pp} & V_{pq} \\ V_{qp} & V_{qq} \end{pmatrix}$

(13)    end // k = 1:N/2
(14)    [top, bot] = music(top, bot, N)
(15) end // set = 1:N-1
(16) end // off(A) > eps

---

According to some embodiments, steps 5 through 13 of Algorithm 9 use batched operations to compute Schur decomposition, column update of A and V, and row update of A. According to some embodiments, the tile size w is set to 16 so that the subproblem may fit in the on-chip shared memory, and therefore one Schur decomposition can be computed per thread block.

Embodiments of the present invention are thus described. While the present invention has been described in particular embodiments, it should be appreciated that the present invention should not be construed as limited by such embodiments, but rather construed according to the following claims.

Embodiments of the present invention harnesses the parallelism of modern processors (e.g., graphics processing units) to solve large eigenvalue problems for dense symmetric matrices. The disclosed eigenvalue solvers can be adjusted to improve the speed or accuracy of the eigenvalue solver, includes robust tolerance for passing data throughout a hierarchy of Jacobi methods, and offers significant cost reduction on row update compared to existing methods.

What is claimed is:

1. A method for computing eigenvectors for a symmetric matrix, the method comprising:
   a) executing a first kernel method to decompose the symmetric matrix into a plurality of subproblems;
   b) executing a second kernel method to perform a second Jacobi method variant on a first subproblem of the plurality of subproblems, wherein the second Jacobi method variant is called by the first kernel method and determined based at least in part on a size of the first subproblem;
   c) passing results of the second Jacobi method variant back to the first kernel method;
   d) performing a first Jacobi method variant on the symmetric matrix using the first kernel method and the results of the second Jacobi method variant; and iteratively repeating operations a) through d) until the symmetric matrix converges to a diagonal matrix.

2. The method as described in claim 1, wherein the second Jacobi method variant calls a third Jacobi method variant executed by a third kernel method.

3. The method as described in claim 1, wherein the second Jacobi method variant calls a third Jacobi method variant executed by a third kernel method, wherein operation b) further comprises:

executing the third kernel method to perform the third Jacobi method variant on a second subproblem of the plurality of subproblems, and to pass second results of performing the third Jacobi method variant to the second kernel method, wherein the second subproblem comprises a subproblem of the first subproblem; and executing a fourth kernel method to perform a fourth Jacobi method variant on a third subproblem, and pass third results of the fourth Jacobi method variant to the third kernel method, wherein the third subproblem comprises a subproblem of the second subproblem.

4. The method as described in claim 1, wherein the first Jacobi method variant comprises a Classical Block Jacobi method that receives a tolerance value and a maximum iteration value as input.

5. The method as described in claim 1, wherein the second Jacobi method variant comprises a Parallel Order Block Jacobi method performed using a block size of 16.

6. The method as described in claim 1, wherein operation b) further comprises:

performing a first row update on an upper triangle of a sub-matrix of the symmetric matrix; and performing a second row update on a lower triangle of the sub-matrix by transposing the upper triangle.

7. The method as described in claim 1, wherein the second Jacobi method variant comprises a Schur decomposition operation.

8. The method as described in claim 1, wherein executing the second kernel method to perform the second Jacobi method variant comprises performing a column update operation for the eigenvectors and the symmetric matrix and a row update operation for the symmetric matrix.

9. The method as described in claim 3, wherein executing the third kernel method to perform comprises executing 512 threads within a thread block to form 16 concurrent vectors for performing a plurality of Schur decompositions in parallel.

10. The method as described in claim 3, wherein the third Jacobi method variant returns a number of Schur decomposition operations performed.

11. The method as described in claim 10, wherein operation b) further comprises skipping a row update and a column update of the third Jacobi method variant when the number of Schur decomposition operations performed equals zero.

12. A system for calculating eigenvectors for a symmetric matrix, the system comprising:

a memory configured to store the symmetric matrix and the eigenvectors; and a processor coupled to the memory and configured to:

execute a first kernel method to decompose the symmetric matrix into a plurality of subproblems;

execute a second kernel method to perform a second Jacobi method variant on a first subproblem, wherein the second Jacobi method variant is called by the first kernel method and determined based at least in part on a size of the first subproblem;

pass results of the second Jacobi method variant to the first kernel method;

perform a first Jacobi method variant on the symmetric matrix using the first kernel method and the results of the second Jacobi method variant; and iteratively repeat the executes, the pass and the perform until the symmetric matrix converges to a diagonal matrix.

13. The system as described in claim 12, wherein the second Jacobi method variant calls a third Jacobi method variant executed by a third kernel method.

14. The system as described in claim 12, wherein the second Jacobi method variant calls a third Jacobi method variant executed by a third kernel method, and wherein the processor is further configured to, during at least one iteration of the iteratively repeating:

execute the third kernel method to perform the third Jacobi method variant on a second subproblem, and pass second results of the third Jacobi method variant to the second kernel method, wherein the second subproblem comprises a subproblem of the first subproblem; and execute a fourth kernel method to perform a fourth Jacobi method variant on a third subproblem and pass third results of the fourth Jacobi method variant to the third kernel method.

\* \* \* \* \*